United States Patent [19]

Bruchman

[11] Patent Number: 5,551,710
[45] Date of Patent: Sep. 3, 1996

[54] UNIVERSAL MODULAR SLEEVE-CLAMP SYSTEMS

[75] Inventor: Asher Bruchman, Petach Tikvah, Israel

[73] Assignee: Techcom Technical Computerized Fixturing Ltd., Hefer, Israel

[21] Appl. No.: 396,040

[22] Filed: Feb. 28, 1995

[51] Int. Cl.⁶ .................................................. B23B 31/40
[52] U.S. Cl. ........................... 279/20; 279/2.12; 279/46.6; 279/153; 279/156
[58] Field of Search ................. 279/2.01–2.04, 279/2.1–2.14, 6, 46.6, 152, 153, 156, 123, 50; 269/48.1, 47, 52, 303, 305

[56] References Cited

U.S. PATENT DOCUMENTS

| | | | |
|---|---|---|---|
| 2,736,286 | 2/1956 | Britton | 269/52 |
| 2,964,325 | 12/1960 | Linzell | 279/46.6 |
| 2,994,539 | 8/1961 | Farnsworth | 279/153 |
| 3,716,246 | 2/1973 | Peterson | 279/153 |
| 3,744,809 | 7/1973 | Bennett | 279/153 |
| 3,830,585 | 8/1974 | Nakada et al. | 408/79 |
| 4,023,815 | 5/1977 | Dunham | 279/46.6 |
| 4,632,407 | 12/1986 | Maxam et al. | 279/2.03 |

FOREIGN PATENT DOCUMENTS

1159982  7/1958  France ............................. 279/6

*Primary Examiner*—Steven C. Bishop
*Attorney, Agent, or Firm*—Mark M. Friedman

[57] ABSTRACT

A universal sleeve-clamp for using interchangeable jaw pieces to clamp a workpiece has a sleeve with a plurality of radially moveable elements. Features are provided for locating and attaching the jaw pieces to the radially moveable elements so that, when a clamping taper is made to bear against the radially moveable elements, the radially moveable elements, and hence the interchangeable jaw pieces, are moved radially to clamp the workpiece. The clamping taper may be externally tapered to form an expanding mandrel, or internally tapered to form a collet chuck. The jaw pieces, which are made of soft metal or other easily machinable material, may be shaped for clamping multiple diameters, clamping thin-walled workpieces or for clamping a workpiece eccentrically. A locator plate is used to give additional support to a workpiece, or to align it in a known rotational position for static fixturing.

13 Claims, 9 Drawing Sheets

UNIVERSAL MODULAR SLEEVE-CLAMP SYSTEMS

FIELD AND BACKGROUND OF THE INVENTION

The present invention relates to fixturing for clamping a workpiece during machining in general. In particular it concerns universal expanding clamps for clamping an internal surface of a workpiece and universal contracting clamps for clamping an external surface of a workpiece during grinding, milling, boring or other machining procedures.

It is known to use an expanding mandrel for clamping against an internal surface of a workpiece for grinding, turning and inspection operations. Conventional expanding mandrels are of many types, but may be classified by their mechanism into two categories: expandable-sleeve-type mandrels and insert-type mandrels. Expandable-sleeve-type mandrels have an expandable sleeve axially aligned with a clamping taper so that axial movement of the sleeve relative to the clamping taper expands the sleeve to clamp the internal diameter of the workpiece. Insert-type mandrels have a rigid body with a number of radially moveable inserts which are pushed outward by axial movement of a central clamping taper or a cylindrical piston with inclined slots. These two types of mandrel are in most cases interchangeable. When reference is made below to expandable-sleeve-type mandrels it is to be understood as referring also to insert-type mandrels.

It is also known to use a collet chuck for clamping against an external surface of a workpiece for similar operations. Collet chucks work similarly to expandable-sleeve-type mandrels, with a compressible sleeve (known as a collet) axially aligned within an internally tapered clamping taper. Collet chucks are generally analogous in their structure and function to expanding mandrels.

The use of expanding mandrels is potentially an important clamping technique since it provides access to the entire outer surface of a workpiece, allowing efficient use of modern machining methods. However, expanding mandrels are currently only used in a small proportion of grinding, turning and inspection applications, and are not used for static fixturing at all.

Reasons for the limited use of expanding mandrels may be divided into two categories: first, economic considerations mitigating against their use; and second, practical limitations of expanding mandrel designs.

Referring first to economic considerations, there are many variables involved in selection of the appropriate expanding mandrel for a particular application. These include: the diameter of the sleeve; the length of the sleeve; the length of the mandrel; the position of a stop along the mandrel; the type of mounting used; and, the method of tightening. Dealing now with each of these variables separately:

(i) The diameter of the sleeve must be chosen to fit the diameter of the internal surface to be clamped. A typical conventional expanding mandrel only expands radially by a fraction of a millimeter, and even insert-type mandrels which are somewhat more expandable have a range of expansion of about one millimeter radially. Thus, for example, to be able to clamp workpieces with a range of diameters from 60 mm. up to 110 mm. typically requires between 80 and 100 different diameters of sleeve.

(ii) The length of the sleeve must also be chosen to fit the internal surface to be clamped. When used with a short workpiece, the sleeve should not be more than 50% longer than the surface to be clamped. For longer workpieces, the sleeve should clamp along a large proportion of the available internal surface so as to support the workpiece securely.

(iii) The length of the mandrel must be chosen so that the sleeve is positioned at the required distance from the mandrel mounting. This is important to ensure access for machining tools to the surface to be machined.

(iv) If a stop is being used, its position along the mandrel must be chosen so that the sleeve is inserted into the workpiece to the right depth.

(v) The type of mounting used also varies between applications. A workpiece with a through-hole may be mounted between centers. A mandrel with a morse-taper may be mounted directly in a machine spindle. For increased stability, or for high torque applications, a mandrel with a flange mounting is required.

(vi) Mandrels which use several methods of tightening are available. The simplest use manual (percussion) tightening. For clamping a workpiece with a through-hole, a mandrel tightened by a clamping screw or nut may be used. Other mandrels have an internally threaded clamping ring, and for power-assisted clamping and automated systems a draw bolt design is required.

Because of all these variables, each expanding mandrel is specific to a very small number of applications. A workshop will therefore commonly need to purchase a large number of mandrels to cover a range of applications, or will have to order a new one for each workpiece to be clamped. Each expanding mandrel is made up of complicated high precision components made from hardened steel and requiring precise internal and external dimensions, high concentricity and slotting of the sleeve to allow expansion. Since each expanding mandrel is therefore time-consuming to produce and costly to buy, the use of expanding mandrels is often abandoned in favor of cheaper alternatives.

Referring now to the practical limitations of expanding mandrel designs, these relate primarily to the clamping action of the expandable sleeve. Conventional expanding mandrels have a cylindrical expandable sleeve which is only suited to clamping a predominantly cylindrical internal surface. If the internal surface of a workpiece has pans with different internal diameters, the sleeve will only clamp either the pan with the smallest diameter or the pan nearer the opening. In many cases the clampable surface will be too small or too close to one end of the workpiece to clamp it effectively against the forces produced during machining and to ensure accurate alignment along the mandrel. Where walls of a workpiece are thin, clamping against a small surface causes deformation, damaging the workpiece. Machining of workpieces in which the external surface is eccentric relative to the internal surface cannot be easily achieved using conventional expanding mandrels.

An additional practical limitation of expanding mandrel designs relates to angular alignment of the workpiece. Many conventional expanding mandrels have a flange-like projection, called a stop, which fixes the position of the workpiece along the mandrel. However, no provisions exist for locating the workpiece in a defined angular position. This limits the usefulness of expandable mandrels for static fixturing for which the precise translational and angular position of the workpiece must be known.

There is therefore a need for universal expanding mandrels which will allow one mandrel to be used for many different workpieces, will enable clamping of multiple internal diameters, will allow easy machining of eccentric workpieces and will enable precise angular alignment of a workpiece about the mandrel.

SUMMARY OF THE INVENTION

The present invention provides a universal modular sleeve-clamp systems which can clamp many different workpieces.

Hence, there is provided according to the teachings of the present invention, a universal sleeve-clamp for using interchangeable jaw pieces to clamp a workpiece, the universal-sleeve clamp comprising: (a) a sleeve having a plurality of radially moveable elements; (b) locating features for locating the interchangeable jaw pieces on the radially moveable elements; (c) attachment features for attaching the interchangeable jaw pieces to the radially moveable elements; and, (d) a clamping taper coaxial with the sleeve, the clamping taper being moveable relative to the sleeve so as to bear against the radially moveable elements thereby forcing the radially moveable elements, and hence the interchangeable jaw pieces, to move radially to clamp the workpiece.

According to a further feature of the present invention, the clamping taper is externally tapered, the radially moveable elements being forced outward so that the interchangeable jaw pieces clamp an internal surface of the workpiece.

According to a further feature of the present invention, the clamping taper is internally tapered, the radially moveable elements being forced inward so that the interchangeable jaw pieces clamp an external surface of the workpiece.

According to a further feature of the present invention, the locating features include at least one projecting ridge attached to or integrally formed with the radially moveable elements, the at least one projecting ridge substantially encircling the sleeve.

According to a further feature of the present invention, each of the radially moveable elements has a threaded recess, the attachment features including a bolt cooperating with each the threaded recess.

According to a further feature of the present invention, there are also provided positioning features for positioning a locator plate for aligning the workpiece.

According to a further feature of the present invention, the positioning features include an intermediate plate securable in a plurality of positions along the universal sleeve-clamp.

There is also provided according to the teachings of the present invention, a universal sleeve-clamp for clamping a workpiece, the universal sleeve-clamp comprising: (a) a sleeve having a plurality of radially moveable elements; (b) a plurality of jaw pieces for attaching to the radially moveable elements; (c) an actuator for actuating radial movement of the radially moveable elements, and hence of the plurality of jaw pieces so that the plurality of jaw pieces clamp the workpiece.

According to a further feature of the present invention, the plurality of jaw pieces are made from an easily machinable material.

According to a further feature of the present invention, the universal sleeve-clamp is used for clamping a workpiece of which a first part has a surface with a first diameter and a second part has a surface with a second diameter. In this case, each of the plurality of jaw pieces has a first portion with a first thickness for clamping the first diameter and a second portion with a second thickness for clamping the second diameter.

According to a further feature of the present invention, each of the plurality of jaw pieces has a shoulder for locating against a stepped surface of the workpiece.

According to a further feature of the present invention, each of the plurality of jaw pieces has an elongated surface to prevent clamping deformation of the workpiece.

According to a further feature of the present invention, the sleeve has a first axis, and wherein each of the plurality of jaw pieces, when attached to the radially moveable element, has a clamping surface lying substantially on a virtual cylinder, the virtual cylinder having a second axis, the second axis being parallel to and displaced from the first axis so that the universal sleeve-clamp clamps the workpiece eccentrically.

There is also provided according to the teachings of the present invention, a universal sleeve-clamp system for clamping a workpiece, the universal fixturing system comprising: (a) a sleeve-clamp having a central axis; (b) a locator cooperating with a pan of the workpiece so as to define the rotational position of the workpiece about the central axis relative to the locator; and (c) an alignment mechanism for aligning the locator in a known rotational position about the central axis relative to the sleeve-clamp.

According to a further feature of the present invention, the alignment mechanism includes an intermediate plate securable in a plurality of positions along the universal expanding mandrel.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of universal expanding mandrels and collet chucks.

The principles of universal expanding mandrels and collet chucks according to the present invention may be better understood with reference to the drawings and the accompanying description.

In the interests of brevity, expanding mandrels and collet chucks, both of expandable/compressible-sleeve type and of insert type, will be referred to below in the specification and claims, individually and/or collectively, as "sleeve-clamps". Similarly, the term "radially moveable elements" will be used to refer, individually and/or collectively, to parts or segments of an expandable/compressible sleeve, and to the inserts of an insert-type mandrel. Internal and external clamping tapers, tapered mandrels and slotted pistons will be referred to, individually and/or collectively, as "actuators".

The novel features of the present invention may be sub-divided into four groups, each group providing solutions to certain problems of the prior art described above. The first group of novel features relates to the use of interchangeable jaw pieces, allowing one size of sleeve-clamp to be used for clamping workpieces with many different sizes and shapes of internal surfaces. These features will be described below with reference to FIGS. 1 to 4. The second group of novel features relates to the use of various designs of locator plate to provide additional support for a workpiece. These features will be described below with reference to FIGS. 5A and 5B. The third group of novel features relates to the use of a locator plate to provide precise angular alignment of a workpiece. These features will be described below with reference to FIGS. 6A and 6B. The last group of novel features relates to the use of an extended mandrel with a moveable intermediate plate enabling one mandrel to be used for clamping workpieces of different lengths. These features will be described below with reference to FIGS. 8A and 8B.

Figure 1:
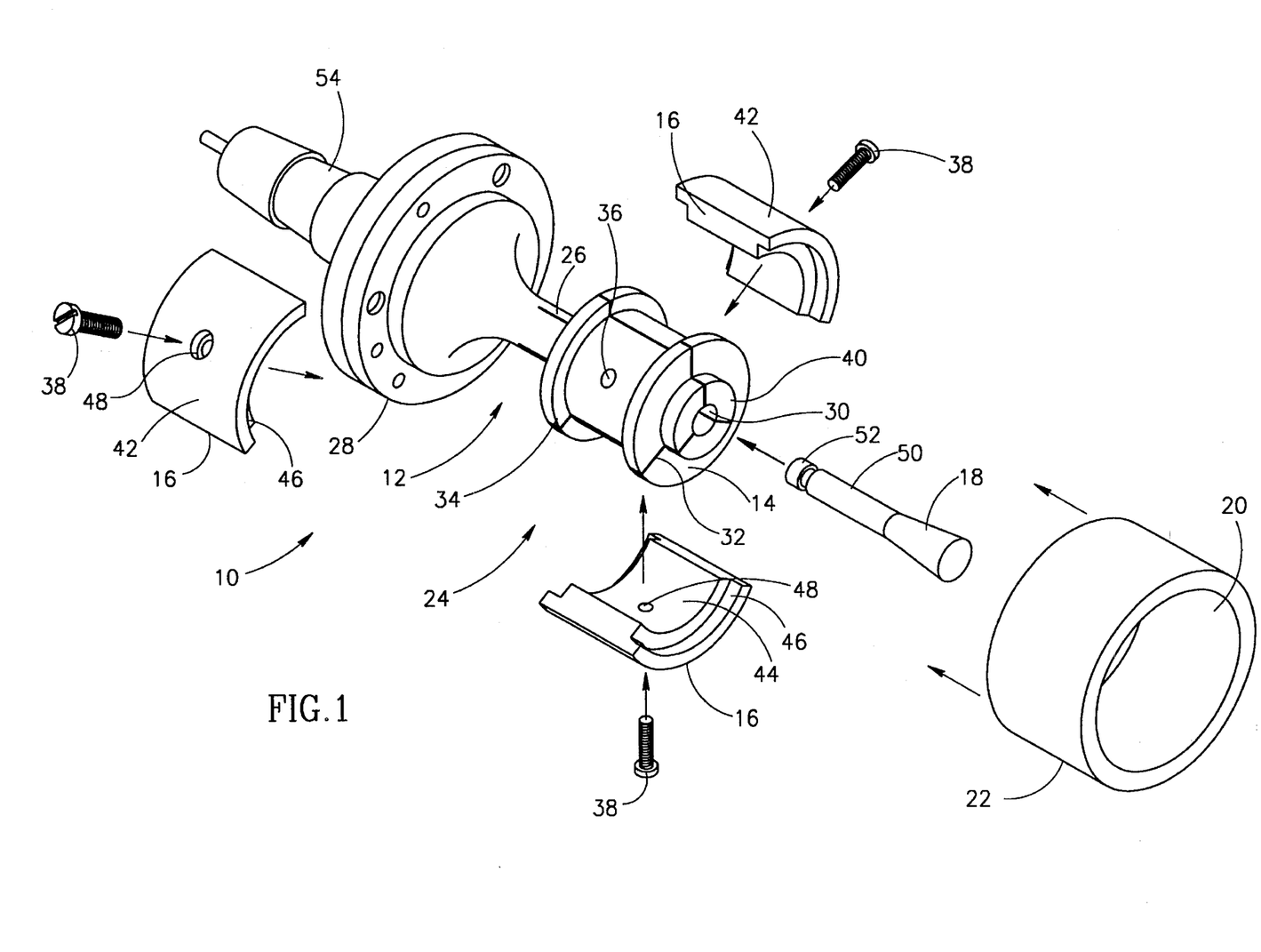
FIG. 1 is an exploded perspective view of a first embodiment of a universal expanding mandrel, having interchangeable jaw pieces, the universal expanding mandrel being constructed and operative according to the teachings of the present invention.

Referring now to the drawings, FIG. 1 shows the parts of a universal expanding mandrel, generally designated 10, constructed and operative according to the principles of the present invention. Generally speaking, universal expanding mandrel 10 has a sleeve 12 with a number of radially moveable segments 14. Radially moveable segments 14 are provided with features for locating and attaching a number of jaw pieces 16. To actuate universal expanding mandrel 10, a clamping taper 18 is made to bear against radially moveable segments 14, forcing them outward and thereby moving jaw pieces 16 to clamp an internal surface 20 of a workpiece 22.

It should be noted that sleeve 12 is substantially symmetrical about a central axis of rotation. When reference is herein made to "the axis of sleeve 12" or a certain feature is described as "axial", it is in reference to the aforementioned axis of rotation. Similarly, the word "radial" is used to refer to lines intersecting and perpendicular to this axis.

More specifically, sleeve 12 has a substantially cylindrical clamping portion 24 attached through a flexible portion 26 to a flange 28. A bore extends axially through sleeve 12 ending in a conical internal surface 30. A number of radial slots 32 extend through clamping portion 24 into flexible portion 26, thereby dividing clamping portion 24 into the leaf-like sections constituting radially moveable segments 14 mentioned above. Each radially moveable segment 14 has projecting ridges 34 for locating one of jaw pieces 16. Projecting ridges 34 together substantially encircle clamping portion 24. Alternatively, a single projecting ridge, isolated projections or any type of projections or grooves may be provided for locating jaw pieces 16. A threaded recess 36 in each radially moveable segment 14 receives a bolt 38 for attaching one of jaw pieces 16. Alternatively, jaw pieces 16 may wedged, clipped, held by adhesive or otherwise attached to radially moveable segments 14. Clamping portion 24 terminates in a cylindrical calibration projection 40.

Jaw pieces 16 are easily produced by common methods "in-house", specifically for each new design of workpiece. Accordingly, jaw pieces 16 are made from soft, easily-workable materials such as aluminum, brass or soft steel. Other metals or other machinable materials may also be used, for example, hard plastics such as Acolon. Structurally, jaw pieces 16 are produced by a sequence of simple machining processes (turning, drilling and cutting), available in any standard workshop. Jaw pieces 16, which are cut from a single annular blank, together have a cylindrical outer surface 42 of equal diameter to internal surface 20 of workpiece 22. The inner surface 44 of jaw pieces 16 is generally cylindrical to fit against the surfaces of radially moveable segments 14, and has slots 46 formed to receive projecting ridges 34 for locating jaw pieces 16. Recessed bolt holes 48 are provided for bolts 38.

Clamping taper 18 is integrally formed with a draw bolt 50 which passes through the axial bore of sleeve 12 so that clamping taper 18 abuts conical internal surface 30. Draw bolt 50 has a threaded end 52 which extends beyond flange 28 to engage a draw-bar or its equivalent for actuating the clamping action.

In this illustration, sleeve 12 is shown attached to an adapter 54 for mounting in the conventional morse taper type machine spindle. Alternatively, it may be attached to other adapters with knurled-ring or other clamping mechanisms, designed for mounting in a machine spindle or for static clamping. Flange 28 may also be used alone for flange-type mounting.

Additional features of flange 28 are relevant to the second and third groups of novel features, as will be described below. In particular, flange 28 is equivalent to flange 144, described below with reference to FIG. 6A.

Before use, universal expanding mandrel 10 is assembled with draw bolt 50 within sleeve 12 and jaw pieces 16 attached to radially moveable segments 14 by bolts 38. For high precision, jaw pieces 16 are made with outer surface 42 slightly larger than required, and universal expanding mandrel 10 is then calibrated. This is done by actuating the clamping action so that radially moveable segments 14 move outward from a non-clamping position to a clamping position. Jaw pieces 16 are then ground, in position ready for use, to the precise diameter and shape of internal surface 20. To maintain the desired degree of expansion during calibration, a non-stretchable calibration ring (not shown) is placed around calibration projection 40.

When calibration is completed, draw bolt 50 is released so that radially moveable segments 14 return to their non-clamping position, and the calibration ring is removed. Universal expanding mandrel 10 is then ready for use.

It should be appreciated that, in clear contrast to conventional expanding mandrels, universal expanding mandrel 10 may be used with jaw pieces 16 of different thicknesses, as described above, to clamp workpieces with a wide variety of bore sizes. For example, one sleeve 10 may be used to clamp bore sizes over a range from 60 mm. to 110 mm. diameter. More than eighty conventional mandrels would generally be required to span the same range of sizes.

Figure 2A:
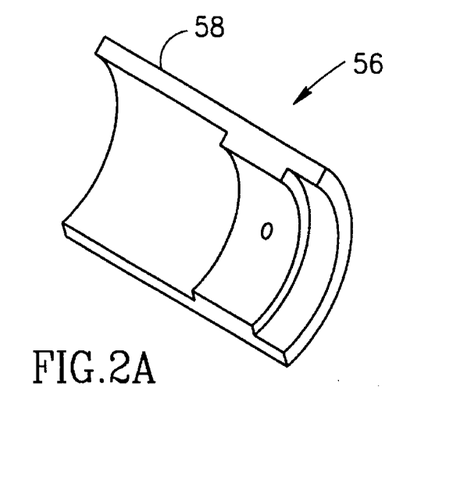
FIG. 2A is a perspective view of an elongated jaw piece to be used with the universal expanding mandrel of FIG. 1 for clamping a thin-walled workpiece.

Referring now to FIGS. 2A, 2B, 2C and 2D, there are shown a number of variant forms of jaw pieces 16, for various applications. FIG. 2A shows a jaw piece, generally labelled 56, for clamping an internal surface of a thin-walled workpiece without causing clamping deformation. Jaw piece 56 has an elongated surface 58 which spreads the force of the clamping action of the mandrel over a large area.

Figure 2B:
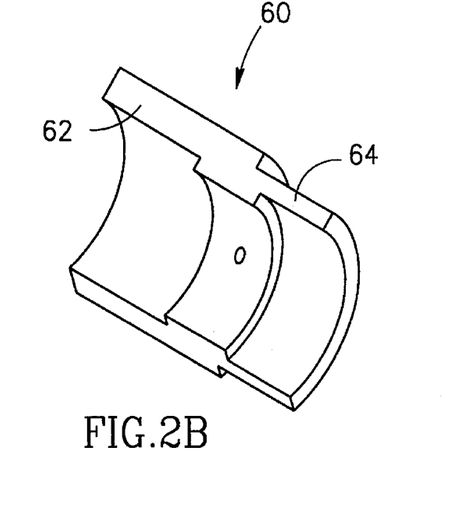
FIG. 2B is a perspective view of a jaw piece to be used with the universal expanding mandrel of FIG. 1 for clamping a workpiece with a stepped internal surface.

FIG. 2B shows a jaw piece, generally labelled 60, for clamping an internal surface of a workpiece of which a first part of the internal surface has a first diameter and a second part of the internal surface has a second diameter. Jaw piece 60 has a portion 62 with a first thickness for clamping the first diameter and a portion 64 with a second thickness for clamping the second diameter.

Figure 2C:
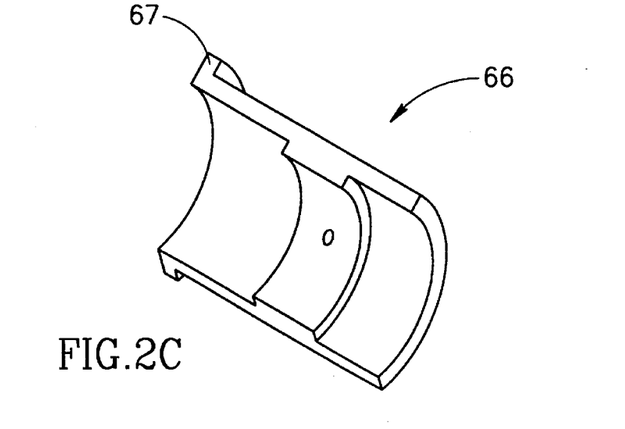
FIG. 2C is a perspective view of a jaw piece to be used with the universal expanding mandrel of FIG. 1 for clamping and locating against an internal plane of a workpiece.

FIG. 2C shows a jaw piece, generally labelled 66, for locating and clamping a workpiece which has a step in its internal surface. Jaw piece 66 has a shoulder 67 for locating against the step.

Figure 2D:
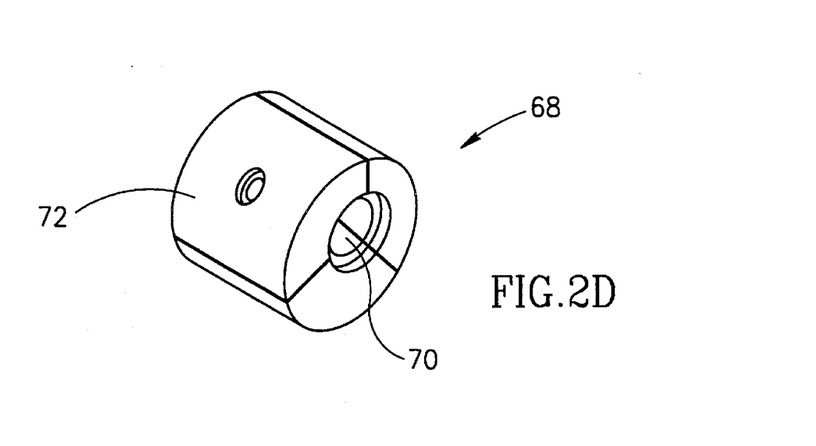
FIG. 2D is a perspective view of a set of interchangeable jaws to be used with the universal expanding mandrel of FIG. 1 for clamping a workpiece eccentrically relative to the mandrel.

FIG. 2D shows a set of jaws, generally labelled 68, for clamping the internal surface of a workpiece eccentrically with respect to the axis of sleeve 12. Set of jaws 68, when positioned on sleeve 12, has an internal surface 70 attached to radially moveable segments 14, and an external clamping surface 72 which lies substantially on a virtual cylinder. This virtual cylinder has a central axis parallel to and displaced from the axis of sleeve 12 so that universal expanding mandrel 10 clamps the workpiece eccentrically.

While the features of the first embodiment of a universal expanding mandrel have been described, by way of example, in the context of sleeve 12 integrally formed with flange 28, it should be understood that the principles of the present invention may equally be applied to other configurations. For example, a sleeve without a flange may be used in combination with a basis having a clamping taper. Similarly, a sleeve with two clamping portions may be used. In the latter case, the universal expanding mandrel is actuated by opposing motion of two clamping tapers, one attached to a draw bolt, and a second formed on a basis.

Figure 3:
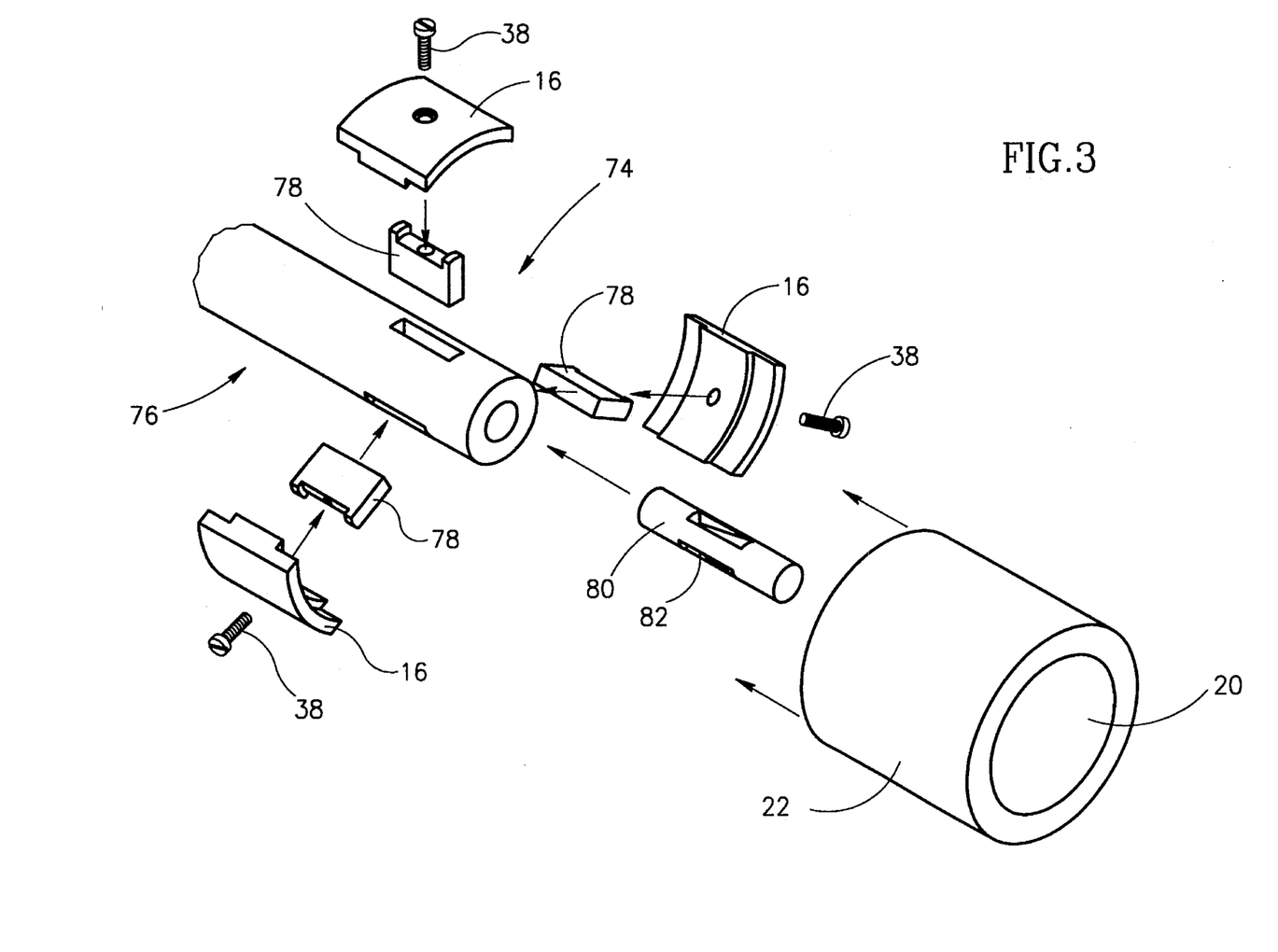
FIG. 3 is an exploded perspective view of a second embodiment of a universal expanding mandrel, based on an insert-type mandrel design, constructed and operative according to the teachings of the present invention.

With reference now to FIG. 3, there is shown a second embodiment of a universal expanding mandrel, generally designated 74. Universal expanding mandrel 74 is an insert-type mandrel, similar in structure and equivalent in function to universal expanding mandrel 10. Equivalent elements are designated similarly. Universal expanding mandrel 74 has a rigid body 76 with a number of radially moveable inserts 78. Each insert 78 is provided with features for positioning and attaching interchangeable jaw pieces equivalent to the features of radially moveable segments 14 described above. Inserts 78 are pushed outward by axial movement of a cylindrical piston 80 with inclined slots 82. Alternatively, a clamping taper may be used.

It should be appreciated that radially moveable inserts 78 need not move precisely radially. The exact nature of the movement depends on the specific design of rigid body 76. However, it is the radial component of the movement which is effective to clamp workpiece 22.

Figure 4:
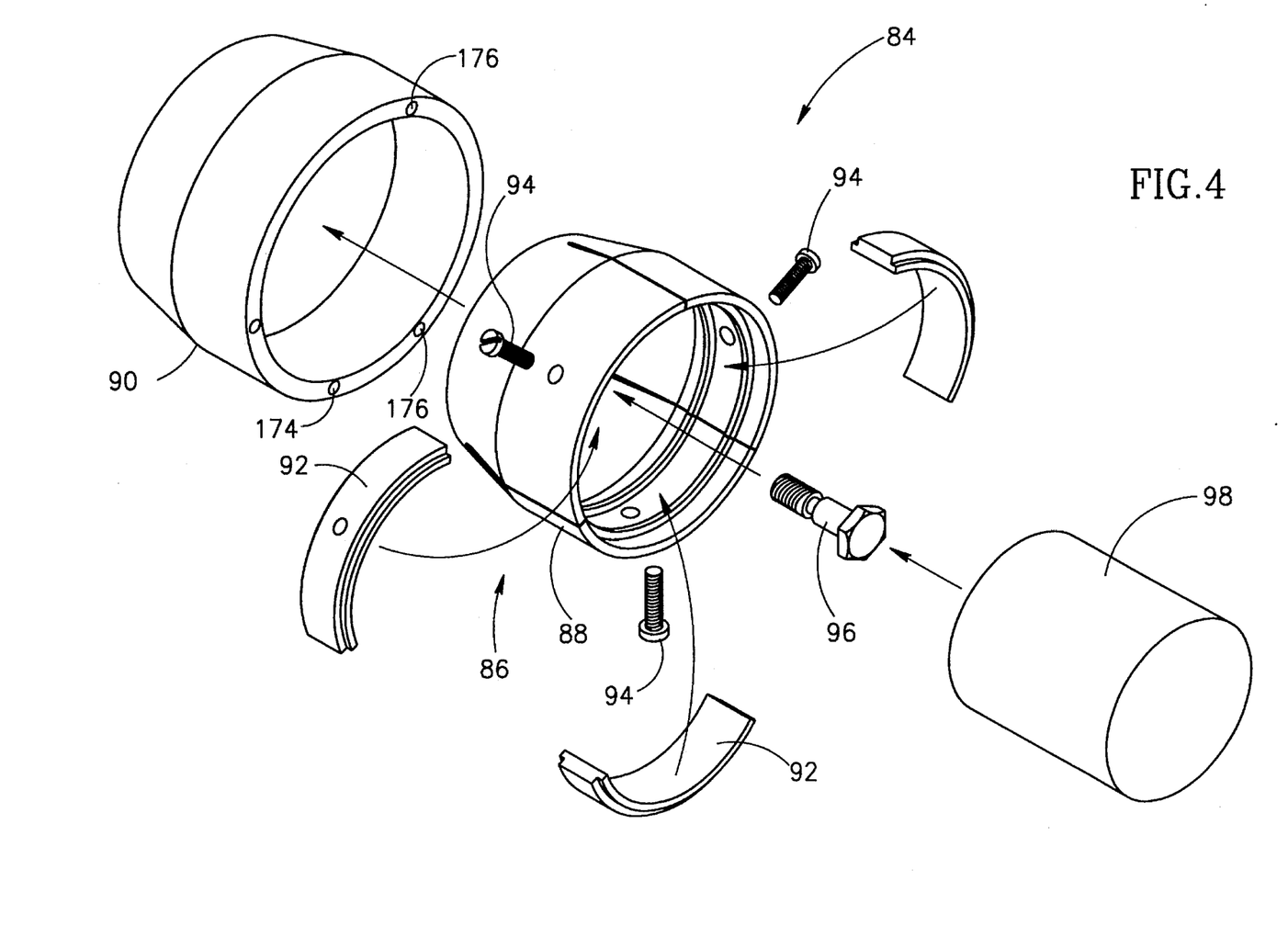
FIG. 4 is an exploded perspective view of a universal collet chuck, constructed and operative according to the teachings of the present invention.

With reference now to FIG. 4, there is shown a universal collet chuck, generally designated 84, constructed and operative according to the teachings of the present invention. The structure and function of universal collet chuck 84 is similar to that of universal expanding mandrel 10 described above, excepting that the latter expands whereas the former contracts to clamp a workpiece.

Thus, collet chuck 84 has a sleeve 86 with a number of radially moveable segments 88. Sleeve 86 is axially aligned within an internally tapered clamping taper 90. The back surface of clamping taper 90 is preferably provided with features equivalent to flanges 28 and 144 described below. Radially moveable segments 88 have internal features analogous to the external features of radially moveable segments 14 for receiving jaw pieces 92. Jaw pieces 92 are attached by externally tightened bolts 94. A draw bolt 96 is provided for drawing sleeve 86 against clamping taper 90.

In use, draw bolt 96 is actuated, drawing sleeve 86 against clamping taper 90, so as to cause radially moveable segments 88 to move inward. Jaw pieces 92 are thereby forced inward to clamp a workpiece 98.

It should be understood that any of the features of jaw pieces 16 described above with reference to FIGS. 2A, 2B, 2C and 2D are also applicable to jaw pieces 92.

Turning now to the second group of novel features, the use of various designs of locator plate to provide additional support for a workpiece will be described with reference to FIGS. 5A and 5B. Although these features will be described in the context of an otherwise conventional expanding mandrel, they may advantageously be combined with the novel designs of expanding mandrels and collet chucks described above.

Figure 5A:
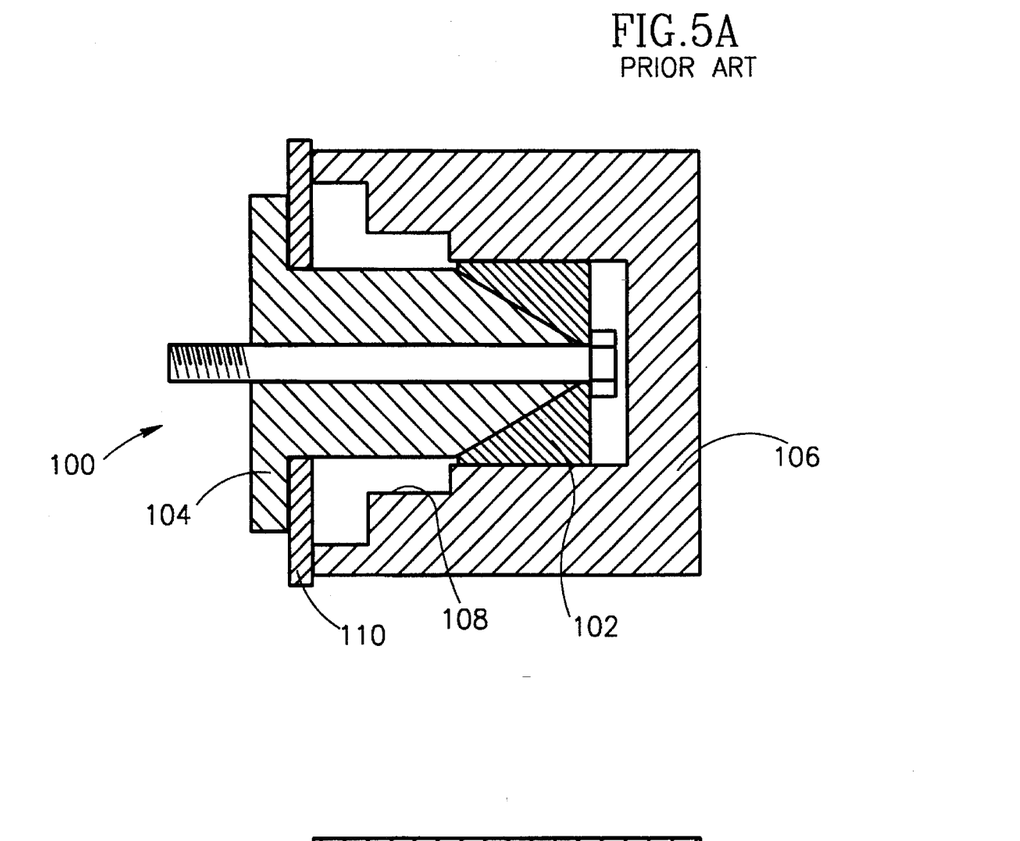
FIG. 5A is a schematic cross-sectional view illustrating the prior art use of a mandrel with a stop for clamping a workpiece.

FIG. 5A illustrates the use of a workpiece stop, according to the prior art. An expanding mandrel 100, which has an expandable sleeve 102 and a flange 104, is shown clamping a workpiece 106 with a stepped internal surface 108. A stop 110, attached to flange 104, ensures that expandable sleeve 102 enters workpiece 106 to the required depth. Due to the shape of internal surface 108, only a relatively small proportion of workpiece 106 is directly clamped by expandable sleeve 102. It is therefore easy for workpiece 106 to be forced out of alignment with expanding mandrel 100 by the forces generated during machining. This results in loss of accuracy and may, in high speed applications, lead to dangerous accidents.

Figure 5B:
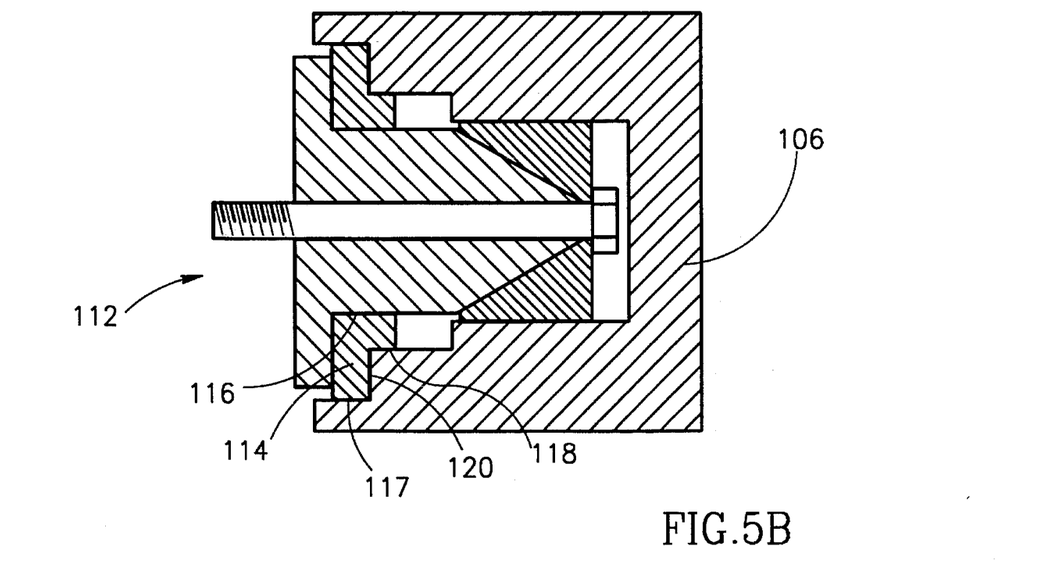
FIG. 5B is a schematic cross-sectional view illustrating the use of a shaped locator plate, constructed and operative according to the teachings of the present invention, for additionally supporting a workpiece clamped by an expanding mandrel.

Referring now to FIG. 5B, workpiece 106 is shown clamped by an expanding mandrel 112, and additionally supported by a locator plate 114, constructed and operative according to the teachings of the present invention. Locator plate 114 is of generally annular form, with an internal diameter 116 fitting closely around expanding mandrel 112. Locator plate 114 is attached to expanding mandrel 112 by bolts (not shown). Locator plate 114 has an external surface shaped to fit the internal surface of a given workpiece, in this case a cylindrical part 117 with a first diameter, a cylindrical part 118 with a second diameter, and a front edge 120. Front edge 120 acts as a stop, defining the precise position of workpiece 106 along expanding mandrel 112. Cylindrical parts 117 and 118 match stepped internal surface 108 to provide additional support for workpiece 106, preventing lateral movement perpendicular to the axis of expanding mandrel 112. Workpiece 106 is thereby maintained in exact alignment with expanding mandrel 112 throughout the machining process.

Locator plate 114 need not be symmetrical, but may be shaped in any appropriate manner to compliment the shape of a given workpiece.

It should be appreciated that the principle of this type of locator plate may also be applied to collet chucks. The attachment of a locator plate to a collet chuck will be described below.

Turning now to the third group of novel features, these will be described with reference to FIGS. 6A and 6B. The third group of novel features concern the use of a locator attached to a locator plate, enabling a workpiece to be clamped in a precisely known translational and angular position. This enables expanding mandrels and collet chucks to be used effectively for static fixturing applications. Since expanding mandrels do not obstruct the external surfaces of a workpiece, their use allows multiple machining operations to be performed on five sides of a workpiece without changing its clamping position, thereby realizing the full potential of modern numerical control machining centers. Although the third group of novel features will be described in the context of an otherwise conventional expanding mandrel, they may advantageously be combined with the novel designs of expanding mandrels and collet chucks described above.

Figure 6A:
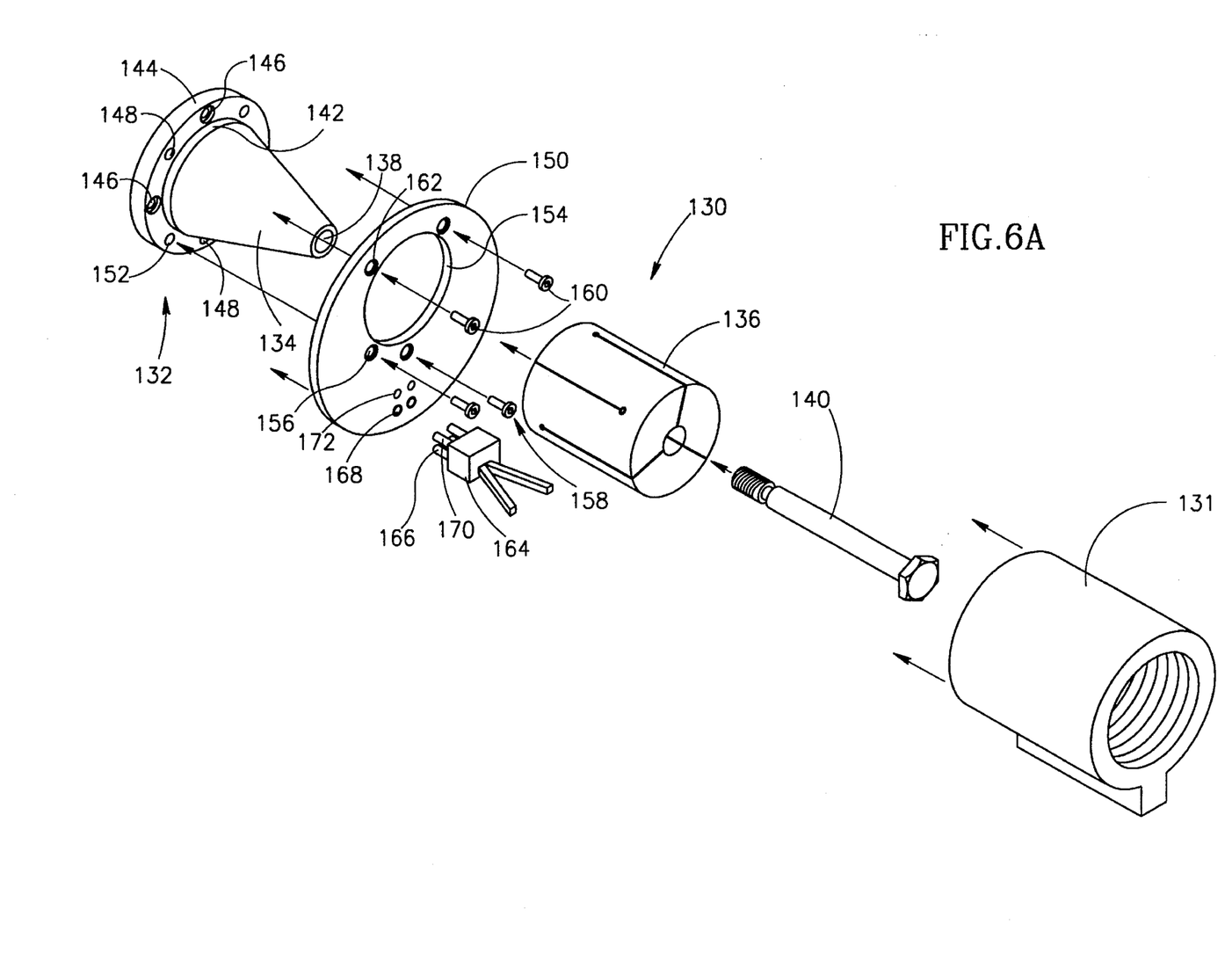
FIG. 6A is an exploded perspective view of a universal expanding mandrel, constructed and operative according to the teachings of the present invention, in which a locator plate and a locator are used to align a workpiece.
Figure 6B:
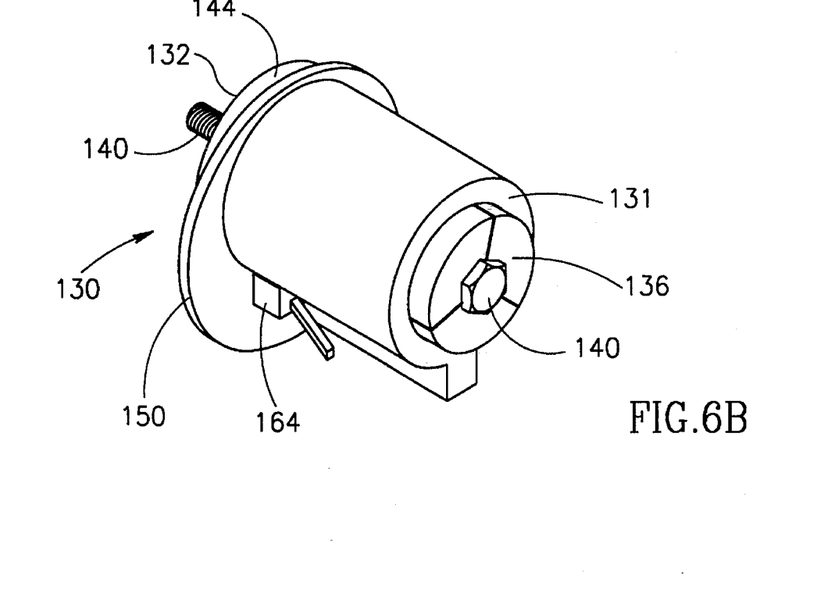
FIG. 6B is a perspective view of the universal expanding mandrel of FIG. 6A in use.

Referring now to FIGS. 6A and 6B, there is shown an expanding mandrel, generally designated 130, constructed and operative according to the teachings of the present invention, for static fixturing of a workpiece 131. Expanding mandrel 130 includes a basis 132 which has a clamping taper 134 for receiving an expandable sleeve 136, and an axial bore 138 for receiving a draw bolt 140. Basis 132 also has a cylindrical portion 142 and a flange 144. In addition to a number of recessed bolt holes 146 for mounting expanding mandrel 130, flange 144 also has a number of threaded recesses 148 for attaching a locator plate 150, and an alignment hole 152.

Locator plate 150 has a main precision bore 154 for locating on cylindrical portion 142. For precise angular alignment of locator plate 150 with flange 144, locator plate 150 is provided with an alignment hole 156. A pin 158 is used to maintain precise alignment between alignment hole 156 and alignment hole 152, and preferably extends beyond flange 144 for aligning expanding mandrel 130 relative to its mounting. Locator plate 150 is attached to flange 144 by a number of bolts 160 positioned in recessed bolt holes 162.

Locator plate 150 acts as a workpiece stop, and also receives a V-block locator 164 for aligning workpiece 131 relative to the axis of expanding mandrel 130. V-block locator 164 is positioned on locator plate 150 by pins 166 in precision bores 168, and is attached by bolts 170 engaged in threaded bores 172. V-block locator 164 may be replaced by whatever design of locator is suited to a given workpiece, as is known in the art of static modular fixturing.

FIG. 6B shows expanding mandrel 130 assembled and in use to clamp workpiece 131. Since the angular alignment of workpiece 131 relative to locator plate 150 is defined by V-block locator 164, and pin 158 maintains the alignment of locator plate 150 with basis 132 and thereby with the mounting, the angular position of workpiece 131 clamped by this method is precisely known. Similarly, the translational position of workpiece 131 is precisely defined by the axial position of expanding mandrel 130 and the combined thicknesses of flange 144 and locator plate 150. At the same time, minimal obstruction is caused to the external surfaces of workpiece 131. Expanding mandrel 130 thus provides a near-ideal method of clamping for static fixturing.

As mentioned above, the second and third groups of novel features may be used in combination with the collet chucks of the present invention. In order to receive the required locator plates, the front edge of clamping taper 90 (FIG. 4) is provided with at least one precision alignment hole 174 and a plurality of threaded recesses 176, equivalent to alignment hole 152 and threaded recesses 148 of flange 144.

Figure 7:
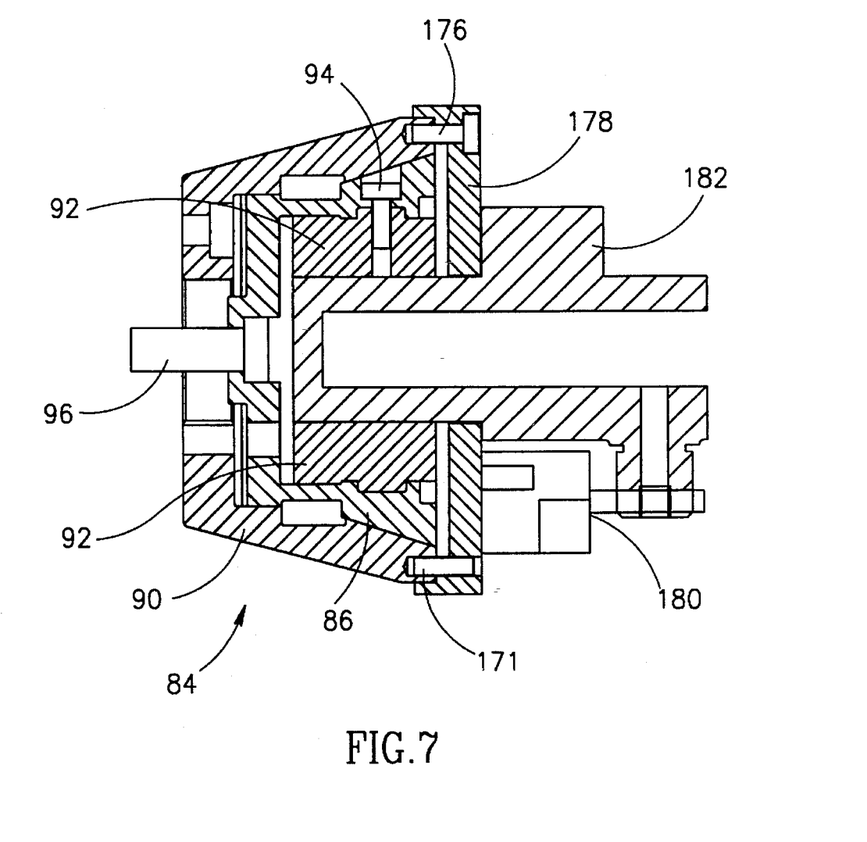
FIG. 7 is a cross-sectional view through the universal collet chuck of FIG. 4, used with a locator plate, constructed and operative according to the teachings of the present invention, for aligning and clamping a workpiece.

FIG. 7 illustrates the use of collet chuck 84 with a locator plate 178 and locator 180 to align and clamp a workpiece 182. In this example, locator plate 178 combines the features of both the second and third groups of novel features, providing additional support to workpiece 182 and positioning locator 180 to align workpiece 182.

Turning now to the last group of novel features, the use of an extended mandrel with a moveable intermediate plate for clamping workpieces of different lengths will be described with reference to FIGS. 8A and 8B. These features will be described in the context of a preferred embodiment which incorporates many of the novel features described above. However, these features may also be used to advantage in combination with other features of novel expanding mandrels and collet chucks described above, or with otherwise conventional expanding mandrels.

Figure 8A:
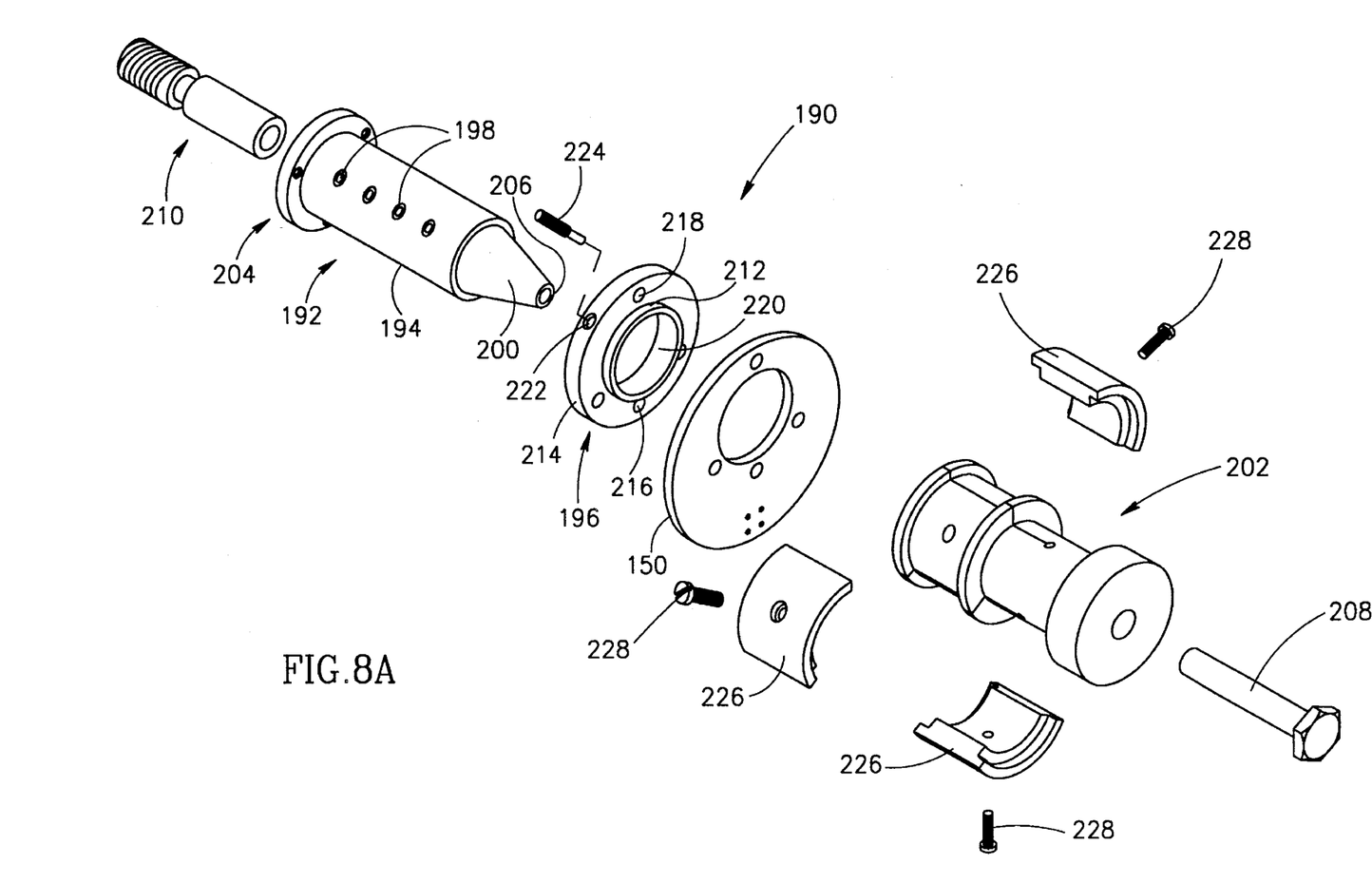
FIG. 8A is an exploded perspective view of a universal expanding mandrel, constructed and operative according to the teachings of the present invention, having a moveable intermediate plate.
Figure 8B:
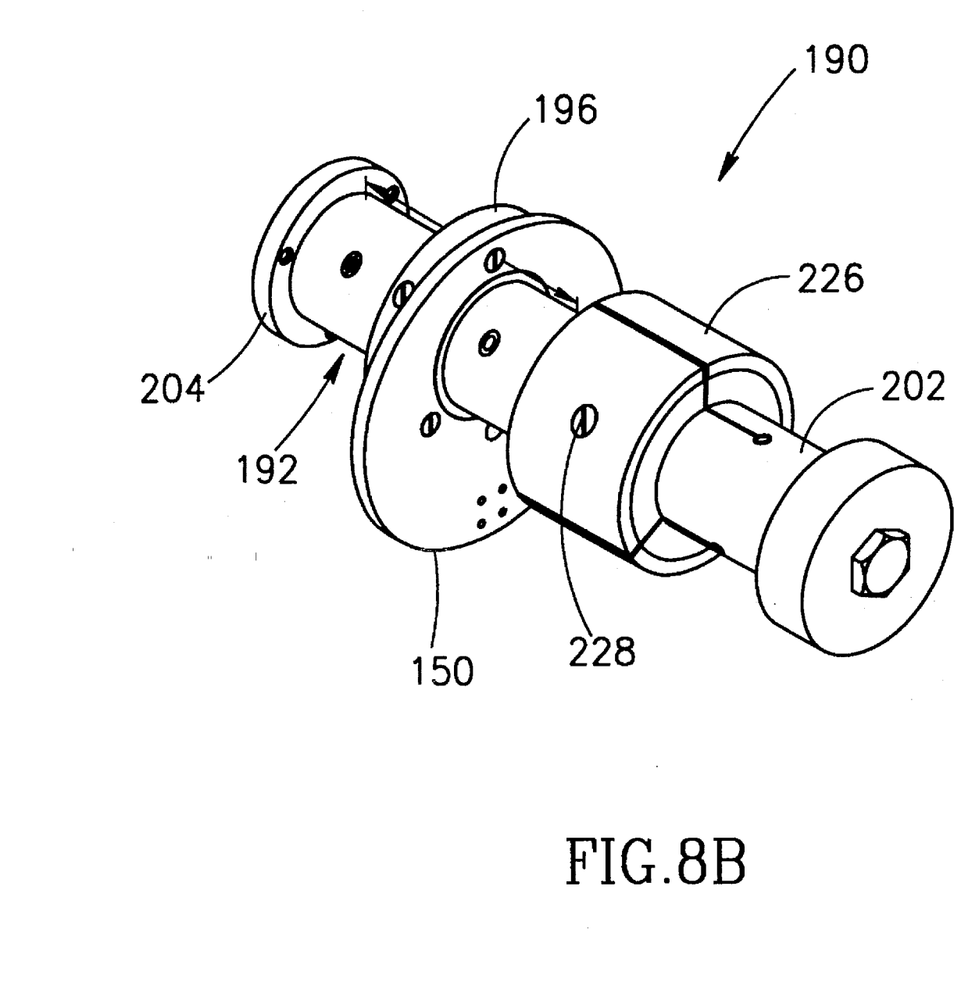
FIG. 8B is a perspective view of the universal expanding mandrel of FIG. 8A ready for use.

Referring now to FIGS. 8A and 8B, there is shown a universal expanding mandrel, generally designated 190, constructed and operative according to the teachings of the present invention. Universal expanding mandrel 190 includes an extension basis 192 which has an elongated portion 194 for receiving an intermediate plate 196. A plurality of precision positioning holes 198 are spaced along elongated portion 194. Typically, elongated portion 194 has a length of between 40 mm. and 120 mm. The pitch of precision positioning holes 198 is typically less than about 30 mm. and preferably about 20 mm. Extension basis 192 also has a clamping taper 200 for receiving a sleeve 202, a flange 204 for mounting universal expanding mandrel 190 and an axial bore 206 for receiving a draw bolt 208 and a draw bolt extension 210.

Intermediate plate 196 is similar to basis 132 described above, having a cylindrical portion 212, and a flange 214 which has a precision alignment hole 216 and a number of threaded recesses 218. This enables intermediate plate 196 to receive locator plate 150 as described above with reference to FIG. 6A. Intermediate plate 196 can also receive the other novel designs of locator plate described above, as well as conventional workpiece stops. Intermediate plate 196 also has a large axial bore 220 shaped to fit against and be slidable along the length of elongated portion 194. A part-threaded hole 222, extending radially through intermediate plate 196, receives a part-threaded positioning rod 224. Positioning rod 224 may be engaged in any one of positioning holes 198, so that intermediate plate 196 is securable in a plurality of positions along extension basis 192.

Sleeve 202 with its jaw pieces 226 and bolts 228 are similar in structure and function to sleeve 12, jaw pieces 16 and bolts 38 (FIG. 1). Since sleeve 202 is mounted on clamping taper 200, flange 28 is not required.

FIG. 8B shows universal expanding mandrel 190 assembled and ready for use. The universal nature of universal expanding mandrel 190 may now clearly be appreciated. Intermediate plate 196 can be secured at the required position along extension basis 192 to provide the correct clamping depth for a given workpiece. Intermediate plate 196 may support locator plate 150 for static mounting, or other locator plates or conventional stops. Sleeve 202 may be used with different sizes and shapes of jaw pieces 226 to clamp workpieces with internal surfaces of a wide range of diameters and varied features, as described with reference to FIGS. 1 and 2 above. Flange 204 enables universal expanding mandrel 190 to be mounted in a machine spindle with the: conventional flange fitting, or to other standard mountings using simple adapters. For static fixturing, adapters may be used to mount universal expanding mandrel 190 on conventional modular fixturing systems based on a matrix of precisely positioned holes or on a slotted grid, or to mount it on a novel universal modular fixturing system as described in the co-pending patent application filed together with this application.

It will be appreciated that the above descriptions are intended only to serve as examples, and that many other embodiments are possible within the scope and the spirit of the invention.

What is claimed is:

1. A universal sleeve-clamp for using interchangeable jaw pieces to clamp and align a workpiece, the universal-sleeve clamp comprising:
   (a) a sleeve having a plurality of radially moveable elements;
   (b) locating means for locating the interchangeable jaw pieces on said radially moveable elements;
   (c) attachment means for attaching the interchangeable jaw pieces to said radially moveable elements;
   (d) a clamping taper coaxial with said sleeve, said clamping taper being moveable relative to said sleeve so as to bear against said radially moveable elements thereby forcing said radially moveable elements, and hence the interchangeable jaw pieces, to move radially to clamp the workpiece; and
   (e) positioning means for positioning a locator plate for aligning the workpiece.

2. A universal sleeve-clamp as in claim 1 wherein said clamping taper is externally tapered, said radially moveable elements being forced outward so that the interchangeable jaw pieces clamp an internal surface of the workpiece.

3. A universal sleeve-clamp as in claim 1 wherein said clamping taper is internally tapered, said radially moveable elements being forced inward so that the interchangeable jaw pieces clamp an external surface of the workpiece.

4. A universal sleeve-clamp as in claim 1 wherein said locating means includes at least one projecting ridge attached to or integrally formed with said radially moveable elements, said at least one projecting ridge substantially encircling said sleeve.

5. A universal sleeve-clamp as in claim 1 wherein each of said radially moveable elements has a threaded recess, said attachment means including a bolt cooperating with each said threaded recess.

6. A universal sleeve-clamp as in claim 1 wherein said positioning means includes an intermediate plate securable in a plurality of positions along the universal sleeve-clamp.

7. A universal sleeve-clamp for clamping a thin-walled workpiece, the universal sleeve-clamp comprising:
   (a) a sleeve having a plurality of radially moveable elements;
   (b) a plurality of jaw pieces for attaching to said radially moveable elements, each of said jaw pieces having an elongated clamping surface extending along and beyond said radially moveable elements; and
   (c) an actuator for actuating radial movement of said radially moveable elements, and hence of said plurality of jaw pieces so that said elongated clamping surfaces of said plurality of jaw pieces clamp the workpiece over a large area, thereby avoiding clamping deformation.

8. A universal sleeve-clamp as in claim 7 wherein said plurality of jaw pieces are made from an easily machinable material.

9. A universal sleeve-clamp as in claim 7 for clamping a workpiece of which a first part has a surface with a first diameter and a second part has a surface with a second diameter, wherein each of said plurality of jaw pieces has a first portion with a first thickness for clamping the first diameter and a second portion with a second thickness for clamping the second diameter.

10. A universal sleeve-clamp as in claim 7 wherein each of said plurality of jaw pieces has a shoulder for locating against a stepped surface of the workpiece.

11. A universal sleeve-clamp as in claim 7, wherein said sleeve has a first axis, and wherein each of said plurality of jaw pieces, when attached to said radially moveable element, has a clamping surface lying substantially on a virtual cylinder, said virtual cylinder having a second axis, said second axis being parallel to and displaced from said first axis so that the universal sleeve-clamp clamps the workpiece eccentrically.

12. A universal sleeve-clamp system for clamping a workpiece, the universal sleeve-clamp system comprising:
   (a) a sleeve-clamp having a central axis;
   (b) a locator cooperating with a part of the workpiece so as to define the rotational position of the workpiece about said central axis relative to said locator; and
   (c) an alignment mechanism for aligning said locator in a known rotational position about the central axis relative to said sleeve-clamp said alignment mechanism including an intermediate plate securable in a plurality of positions along said sleeve-clamp.

13. A universal sleeve-clamp for clamping a workpiece, the universal sleeve-clamp comprising:
   (a) a sleeve having a plurality of radially moveable elements, each of said radially moveable elements having a surface lying on a first virtual cylinder which has a first axis;
   (b) a plurality of jaw pieces for attaching to said surface of said radially moveable elements; and
   (c) an actuator for actuating radial movement of said radially moveable elements, and hence of said plurality of jaw pieces so that said plurality of jaw pieces clamp the workpiece, wherein each of said plurality of jaw pieces, when attached to said radially moveable element, has a clamping surface lying substantially on a second virtual cylinder, said virtual cylinder having a second axis, said second axis being parallel to and displaced from said first axis so that the universal sleeve-clamp clamps the workpiece eccentrically.

* * * * *